Sept. 7, 1954 E. W. FRANCK 2,688,567

METHOD OF SMOOTHING THE COATED SURFACES OF MAGNETIC TAPE

Filed Jan. 17, 1952 2 Sheets-Sheet 1

INVENTOR.
ERNEST W. FRANCK

BY

[signature]

ATTORNEYS

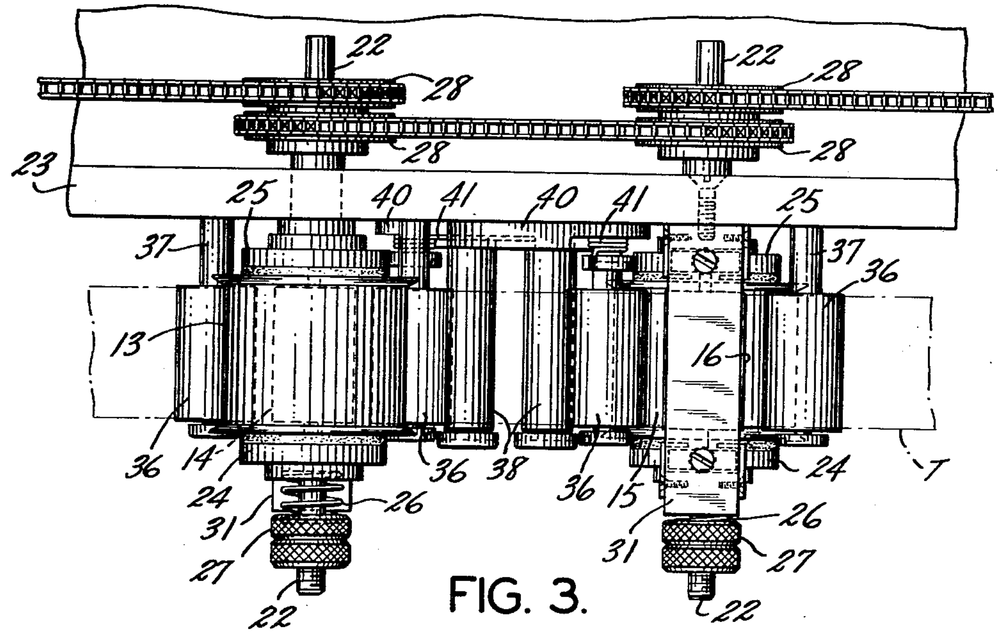
FIG. 3.
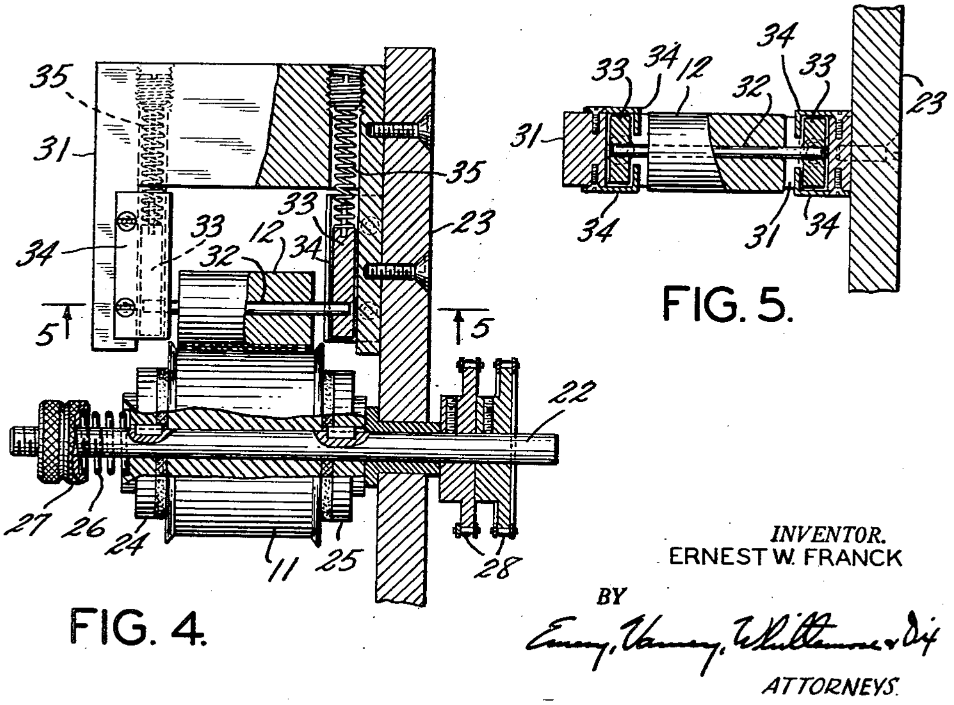
FIG. 5.
FIG. 4.
INVENTOR.
ERNEST W. FRANCK
BY
Emery, Varney, Whittemore & Dix
ATTORNEYS.

Patented Sept. 7, 1954 2,688,567

UNITED STATES PATENT OFFICE 2,688,567

METHOD OF SMOOTHING THE COATED SURFACES OF MAGNETIC TAPE

Ernest W. Franck, Glenbrook, Conn.

Application January 17, 1952, Serial No. 266,961

3 Claims. (Cl. 117—64)

This invention relates to magnetic tape, i. e. tape to which has been applied a coating or layer of adherent material containing a magnetizable substance such as iron oxide, for example. Magnetic tape is now widely used for the recording and reproduction of sound and for other purposes. Accuracy of recording and reproduction is important for all purposes, but for some purposes, such as in computing machines, extreme accuracy is essential.

It has been found that imperfections in the coatings applied to such tape frequently result in inaccuracy of recording or reproduction. Such coatings are usually applied to the tape in liquid form, and it has been observed that after the solvent has evaporated, the surface of the coating is frequently not as smooth as desired. If examined under magnification, the surface is often found to be roughened by small protuberances which have sometimes been referred to as "pimples." These can sometimes be detected by the naked eye or by the touch of the finger. They are probably caused by imperfect grinding of the solid constituents which go into the coating material or by agglomeration of solid constituents during the coating process. But however caused, it has been known that these protuberances may affect the contact of the tape with the recording or playback head of the recording or reproducing apparatus and interfere with the accuracy of the recording or reproduction.

It is an object of the present invention to provide a method of smoothing the surfaces of such coatings.

Other objects and advantages of the invention will appear hereinafter.

A preferred embodiment of the invention selected for purposes of illustration is shown in the accompanying drawings, in which:

Figure 3 is a plan view of two successive groups of rollers.

Figure 4 is a section on the line 4—4 of Figure 2.

Figure 5 is a section on the line 5—5 of Figure 4.

The method of the present invention may be applied to any of the several types of magnetic tape which are now commercially available, regardless of whether the tape itself is made of paper or plastic film and regardless of the type of coating or the manner of application of the coating to the tape. Moreover, the coating may be an overall coating extending across the full width of the tape, or the coating may be in the form of a stripe of a width less than the full width of the tape.

The method of the present invention may also be applied to tape which has been coated with any of several coating formulations known in the art. In all of these which are known to applicant, surface roughness of the type above referred to is observable and may be smoothed by the use of the present invention.

According to the present invention, one small area of coated tape is rubbed against another small area of coated tape while maintaining pressure at the area of contact. Preferably, two lengths of coated tape are moved relative to one another between spaced guide members having opposed tape engaging surfaces which guide the moving lengths of tape to bring their coated surfaces into rubbing contact. Preferably the area of rubbing contact is very small, and by using spaced guide members having curved tape engaging surfaces of relatively short radius, the area of rubbing contact may be reduced to substantially line contact. A pair of spaced rollers having cylindrical tape engaging surfaces of relatively small diameter are a preferred form of guide members because of the elimination of friction. Preferably one of the guide members is spring pressed to exert yielding pressure in the tape over the area of contact.

The two lengths of tape may be fed from two separate tape strips mounted on separate spools or reels. Conveniently, however, a single tape strip may be led between the spaced guide members, and then, after passing around suitable guides, may be led back between said guide members, so that one length of said tape is rubbed against another length of the same tape strip.

Figure 1:
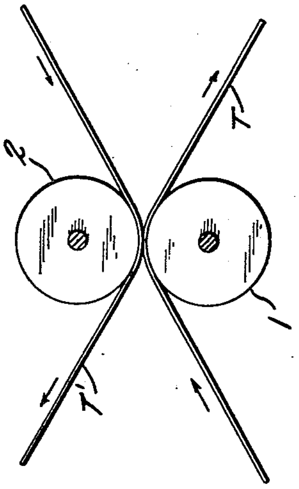
Figure 1 illustrates in semi-diagrammatic form the basic principles of the invention.

Referring to the drawings, the method of the invention may be understood by reference to a simple form of apparatus illustrated diagrammatically in Figure 1. Spaced rollers 1 and 2 of relatively small diameter provide the desired curved tape engaging surfaces.

A length of tape T is led into the bight between the rollers 1 and 2, being held in engagement with roller 1 with the coated surface of the tape exposed, i. e. on the convex surface of the tape as it passes over the roller 1. A similar length of tape T' is led into the bight between the rollers 1 and 2 in the opposite direction, the length T' being held in engagement with roller 2 with its coated surface exposed and in rubbing engagement with the coated surface of the length T which is on the roller 1. The two lengths are now fed in opposite directions, as indicated by the arrows, at any desired speed, with the result that the rubbing of one surface against the other over the very short distance that the surfaces are in contact, smoothes the tape surfaces and eliminates protuberances of the type referred to.

Figure 2:
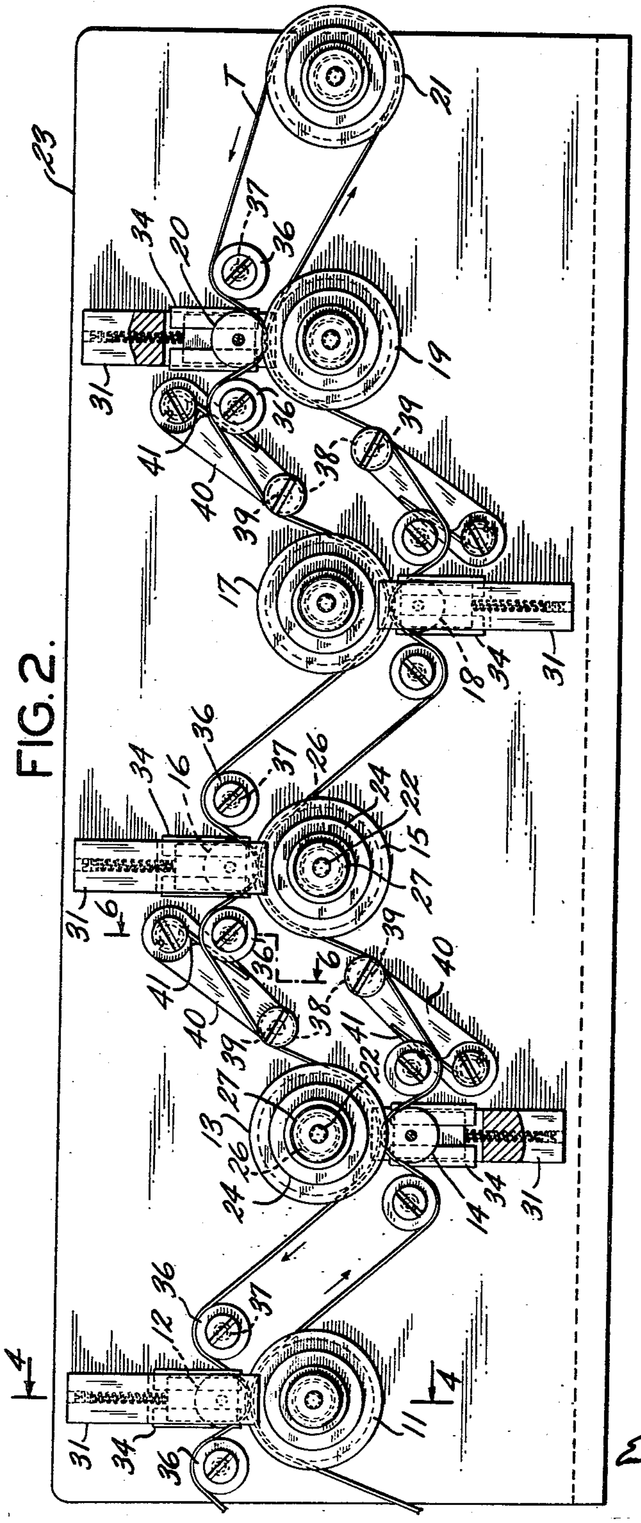
Figure 2 is a front elevation of an apparatus adapted to carry out the method of the invention.
Figure 6:
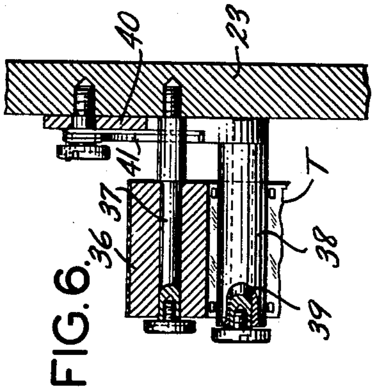
Figure 6 is a section on the line 6—6 of Figure 2.

A somewhat more complex form of apparatus which has been found suitable for commercial operation is illustrated in Figure 2 in which a single tape passes through a series of pairs of rollers and is subjected to rubbing action while passing through each pair of the series. Thus, the tape T is led into the bight between the rollers 11 and 12 comprising the first pair of rollers, then between the successive pairs 13 and 14, 15 and 16, 17 and 18, 19 and 20, then around a roller 21, and then returning, first between 19 and 20, then between 17 and 18, 15 and 16, 13 and 14, and finally between 11 and 12. In this manner, each portion of the coating will be subjected to ten successive rubbing contacts from the time it enters the bight between rollers 11 and 12 until it leaves these rollers.

The rollers 11, 13, 15, 17 and 19 are alike, and in the embodiment illustrated, are driven rollers which drive the tape. Therefore, they are preferably of somewhat larger diameter than the opposed idler rollers 12, 14, 16, 18 and 20, also identical. Roller 21 may be either a driven roller or an idler.

Rollers 11, 13, 15, 17 and 19 are mounted on shafts 22 which extend through the supporting plate 23. The rollers are free to turn on the shafts, but are mounted between disks 24 and 25 which are keyed to the shafts. Felt disks 24′, 25′ are inserted between the disks 24, 25 and the respective roller faces. Disks 24 and 25 are pressed against disks 24′, 25′ and the end faces of the rollers by springs 26 which may be adjusted by nuts 27. Sprockets 28 are fixed to the shafts and rotation of the shafts drives the rollers through the frictional engagement of the disks 24, 25 with disks 24′, 25′ and with the end faces of the rollers.

Rollers 12, 14, 16, 18 and 20 are carried between the legs of U-shaped blocks 31 which are secured to the supporting plate 23. The roller shafts 32 are journalled in blocks 33 which are mounted to slide loosely in channels 34, the rollers being held in yielding engagement with their respective opposed rollers by springs 35 which press against the blocks 33.

The tape is also guided by a plurality of idler rollers 36, which said rollers are arranged in pairs adjacent the rollers 12, 14, 16, 18 and 20 so as to cause the tape to follow the periphery of these rollers for a short distance on either side of the line of contact where the rubbing takes place. The said rollers 36 may be mounted on studs 37 carried on the supporting plate 23.

In order to hold the tape taut during its progress through the rollers, suitable tensioning devices may be provided in the form of idler rollers 38 mounted on studs 39 carried on arms 40 which are pivotally mounted on the supporting plate, being held in yielding engagement with the tape by springs 41.

If desired, the coated surface of the tape may be moistened with a suitable solvent just before entering the rollers. The solvent may be applied in any suitable manner as by spraying or by an applicator and serves to slightly soften the surface of the coating without softening the interior. Alternatively, the outer surface of the coating may be softened by heat, preferably from a source of radiant heat. Also, if desired, the tape may be coated with a suitable lubricant, as for example, carnauba wax dissolved in carbon tetrachloride.

The tape may be fed through the rollers at any desired speed, for within reasonable limits, variations in the rate of speed do not appear to affect the results. In the form of apparatus illustrated in Figure 2, feeding the tape at a speed of 90′ per minute has given excellent results, but higher or lower speeds can also be used satisfactorily.

The exact nature of the smoothing action is not entirely clear. The rubbing action previously described would appear to indicate abrasion, but little or no dust appears to be discharged at the point of rubbing contact. It is possible, therefore, that there is little or no abrasion and that the protuberances are merely pressed down into the coating and smoothed off by plastic deformation. On the other hand, it is possible that the protuberances are abraded off, but that the abraded particles are caught in the bight and pressed down into the coating.

The rubbing action results from the relative motion of the two lengths of tape at the points of contact, and while I have illustrated the two lengths as moving in opposite directions, I am aware that the same results may be achieved by moving the two lengths in the same direction at different speeds.

It will be understood that the invention may be variously modified and embodied within the scope of the subjoined claims.

I claim as my invention:

1. The method of smoothing the dried, coated surface of magnetic tape which comprises moving two lengths of such tape relative to one another in the direction of length between spaced members having opposed tape engaging surfaces which guide each of the moving lengths of tape into longitudinally convex form and bring their coated surfaces into rubbing contact over a line extending across the coated surfaces of the tape, so that a combination of compressive stresses and shear forces will operate on the coated surfaces of said lengths of tape.

2. The method claimed in claim 1 in which said spaced members are rollers having cylindrical tape engaging surfaces.

3. The method claimed in claim 1 in which said rubbing contact is maintained by applying yielding pressure to said lengths of tape engaging surfaces.

References Cited in the file of this patent

UNITED STATES PATENTS

| Number | Name | Date |
|---|---|---|
| 1,842,848 | Steffen | Jan. 26, 1932 |
| 2,388,339 | Paxton | Nov. 6, 1945 |
| 2,525,601 | Howell | Oct. 10, 1950 |

FOREIGN PATENTS

| Number | Country | Date |
|---|---|---|
| 459,884 | Great Britain | Jan. 18, 1937 |